April 30, 1968 SHINJI OHNISHI ET AL 3,380,744

PICKUP DEVICE

Filed March 20, 1967 2 Sheets-Sheet 1

United States Patent Office 3,380,744
Patented Apr. 30, 1968

3,380,744

PICKUP DEVICE

Shinji Ohnishi, Sagamihara, and Kunimasa Nishimura, Tokyo, Japan, assignors to Victor Company of Japan Limited, Yokohama, Japan Filed Mar. 20, 1967, Ser. No. 624,483
Claims priority, application Japan, Mar. 26, 1966, 41/18,615
5 Claims. (Cl. 274—23)

ABSTRACT OF THE DISCLOSURE

A pickup device for phonographs having a pickup arm which receives an inside-force varying through a range according to the playback of records. A first means applies to the arm an outside-force which decreases according to the variation of the inside-force within the range. A second means, in cooperation with the first means, applies to the arm an outside-force which increases according to the variation of the inside-force out of the range.

This invention relates to a pickup device, more particularly to a phonograph pickup device which can negate almost perfectly an inside-force applied to the pickup in playing back records.

In playing back records by a pickup device, generally, a tension directed to the center of records, generally referred to as an inside-force, is applied to the pickup. The inside-force is varied parabolically according to the position of the pickup stylus on the records. In a conventional device for negating such inside-force, an outside-force which decreases progressively in proportion to the position of the pickup arm moving from the outer portion to the inner portion of the records is applied to the pickup arm, therefore, it can not negate fully the inside-force at the inner portion of the records. In accordance with the present invention, the variation of the outside-force for negating the inside-force is effected similar to the parabolic variation of the inside-force, so that the defects in the conventional device can be obviated.

An object of this invention is to provide a pickup device which can negate almost perfectly, over the full extent of record grooves, an inside-force applied to the pickup in playing back records.

Another object of this invention is to provide a pickup device which can obviate almost perfectly a tracing distortion.

A further object of this invention is to provide a pickup device for reproducing stereophonic sound with good balances of right and left channels by contacting the stylus with both right and left sound faces of the record groove under a uniform pressure in playing back stereophonic records, especially "45—45" stereophonic records.

The foregoing and other objects of this invention will be best understood from the following description of exemplifications thereof, reference being had to the accompanying drawings, wherein.

In general, an inside-force F applied to the pickup in playing back records is given by a following formula, $$F=\mu \cdot G \sin \Theta$$

wherein $\mu$ is the coefficient of friction, G is the stylus pressure, and $\Theta$ is the tracking angle, namely the angle made between the tangent of the circle which has a center coaxial with the rotational axis of the record disk at the point where the pickup stylus rides on the records and the straight line which passes through that point and the axis around which the pickup arm is horizontally rotatable.

Figure 4:
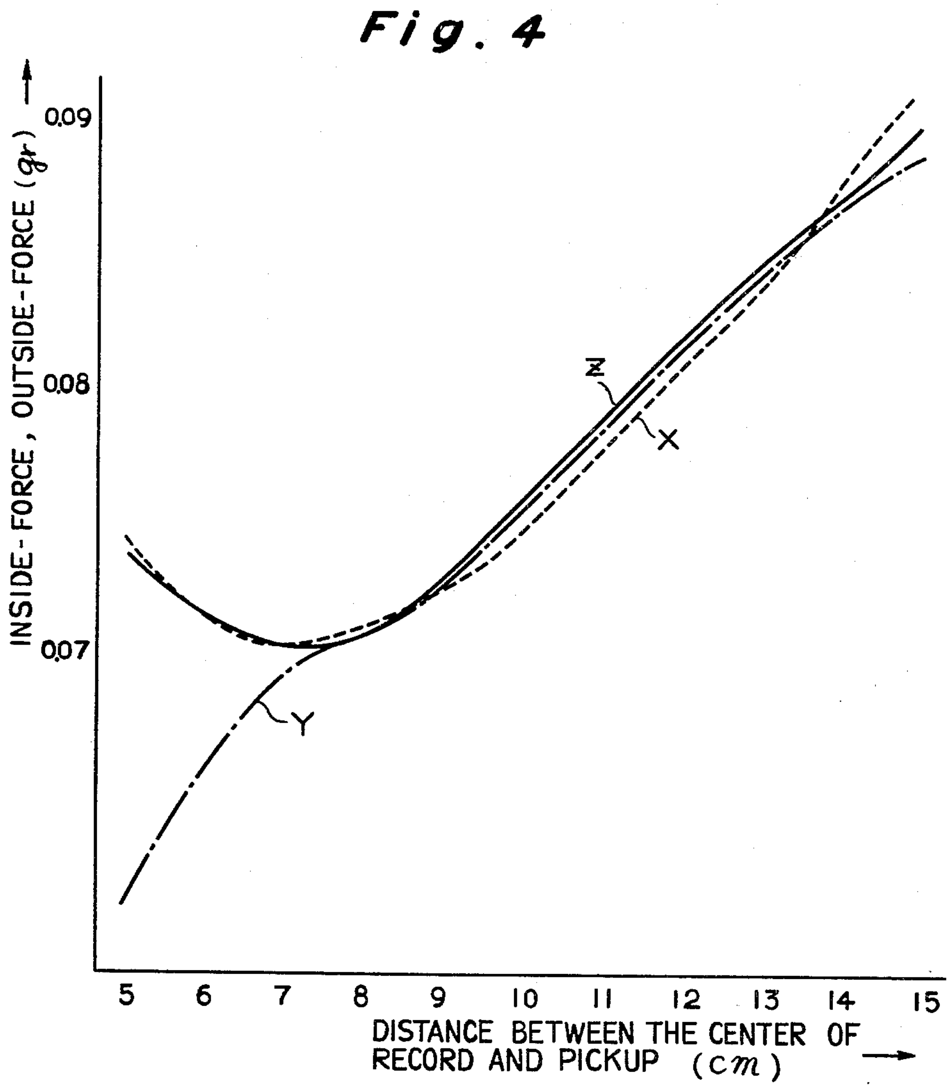
FIGURE 4 is a graph showing variations of an inside-force and outside-force in the pickup device.

Referring to FIGURE 4, X represents a characteristic curve of inside-force distance between the center of records and pickup stylus which is mounted on the tip of a comparatively long arm and has a maximum tracking angle up to about three degrees. As indicated by the above curve X, the inside-force is varied parabolically because the tracking angle is varied parabolically. That is, the inside-force is maximum at the outer portion, minimum at the middle portion, and a certain value higher than the minimum value at the inner portion of the records.

In the conventional device, the maximum outside-force is applied to the pickup arm at the outer portion of the records and the outside-force is decreased progressively in proportion to the position of the pickup stylus moving from the outer portion to the inner portion of the records, in spite of the fact that the inside-force is varied parabolically as stated above, so that the inside-force cannot be negated fully at the inner portion of the records. Y shown in the FIGURE 4 represents a characteristic curve of outside-force distance between the center of records and pickup of the conventional device. It will be apparent from the curves shown in FIGURE 4 that the inside-force can not be negated fully at the inner portion of the records. The curves shown in FIGURE 4 was obtained by using the stylus pressure of one gram.

Figure 1:
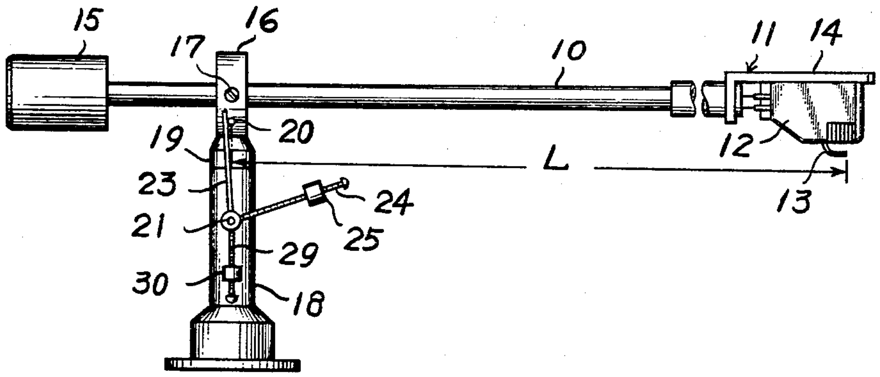
FIGURE 1 is a side view of an embodiment of a pickup device of the invention.
Figure 2:
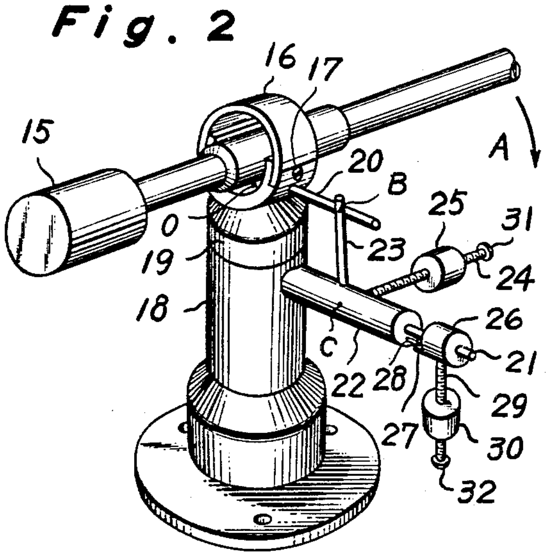
FIGURE 2 is an enlarged perspective view of an important part of the device shown in FIGURE 1.

In accordance with the invention, the inside-force can be negated almost perfectly over the full extent of the record grooves. Referring to FIGURES 1 and 2, 10 is an arm; 11 is a cartridge unit provided on the tip end of said arm 10, and comprised a cartridge 12, stylus 13, and shell 14; 15 is a counter weight provided on the rear end of said arm; 16 is a supporting member for supporting the arm 10 so as to be rotatable in a vertical plane centering around screws 17, said supporting member 16 being provided on a rotary plate 19 positioned on a pedestal 18 so as to be rotatable in a horizontal plane; 20 is a pin fixed one end thereof on the side face of said supporting member 16; 21 is a stationary axle pin fixed one end thereof vertically to the side face of said pedestal 18; 22 is a first rotary collar rotatably fitted with said axle pin 21; 23 and 24 are, respectively, a vertical pin engaging with the pin 20 and a horizontal screw pin, each pin having one end thereof fixed on the outer peripheral surface of said rotary collar 22, respectively; 25 is a first weight screwed with said horizontal screw pin 24; 26 is a second rotary collar rotatably fitted with the other end of said axle pin 21, and has a step portion 27 engaging with a stopper 28 fixed to one end of said first rotary collar 22 so as to form a one way clutch; 29 is a screw pin fixed one end thereof vertically on the under side of said second rotary collar 26, and screwed to a second weight 30; 31 and 32 are heads provided on the other ends of said screw pins 24 and 29, respectively, so as to restrain the first and second weights 25 and 30 on the respective screw pins 24 and 29.

In operation, when the record disk is played back by putting the cartridge 12 on the records, the arm 10 moves in a direction indicated by an arrow A shown in FIGURE 2. According to the movement of the arm 10, the horizontal pin 20 is rotated in the horizontal plane and drives the vertical pin 23 so as to rotate with the first rotary collar 22 centering around the axle 21, so that the horizontal screw pin 24 fixed to the first rotary collar 22 and the first weight 25 are rotated counterclockwise about the axis 21, respectively. If it is designated that a distance OB between a point B where the pin 20 engages to the vertical pin 23 and the center of rotation O of the pin 20 is equal to a distance BC between the point B and the center of rotation C of the vertical pin 23, the angular variation of horizontal pin 24 is equal to that of the arm 10 and a following formula is presented:

$$F \cdot L = W_1 : L_1 \cos \Theta_1$$

wherein L is the distance between the stylus 13 and horizontal rotary axis of the arm 10 (shown in FIGURE1), $W_1$ is the weight of the first weight 25, $L_1$ is the distance between the center line of the stationary axle pin 21 and the center of gravity of the first weight 25 (shown in FIGURE 3), and $\Theta_1$ is the angular variation of the arm 10. By introducing the formula $F = \mu \cdot S \sin \Theta$ into the above formula, it can be written as follows:

$$\mu \cdot S \sin \Theta \cdot L = W_1 \cdot L_1 \cos \Theta_1$$

This formula is effected within a range of 15–7 cm. in radius of the records.

As the left side of said formula, that is, $\mu \cdot S \sin \Theta \cdot L$ is calculated, an inside-force curve according to the variation of $\Theta_1$ can be made using the above formula, and if $W_1$ and $L_1$ are determined such that the right side becomes equal to the left side of said formula, an outside-force counterbalanced to the inside-force can be obtained.

As stated above, such formula is effected within the range 15–7 cm. in radius of the records and at a portion at which the radius is smaller than 7 cm., the left side of said formula becomes large and the right side becomes small, thus the inside-force can not be negated by using only the first weight.

In the conventional device the inside-force in such portion can not be negated as described above, however, in the present invention the inside-force in such portion can be negated as described herebelow.

In the device of this invention, a compensating means for such portion comprises the second rotary collar 26, the screw pin 29, and the second weight 30. At the beginning of playing back records, this compensating means is not operated as the second rotary collar 26 is in a state free from the stopper 28 within the range of 15–7 cm. in radius of the records. When the stylus 13 moves in the direction indicated by the arrow A, the first rotary collar 22 is rotated in the counterclockwise direction, and when the stylus 13 reaches to the portion at which radius is smaller than 7 cm., the stopper 28 fixed to one end of the first rotary collar 22 is engaged with the step portion 27 of the second rotary collar 26, thus the first and second collars 22 and 26 are connected and the second weight 30 is rotated about the axis 21 and raised upwards.

Figure 3:
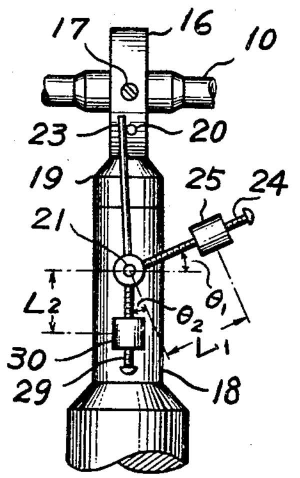
FIGURE 3 is a side view of the part shown in FIGURE 2.

As the first and second weights 25 and 30 are effected to produce an outside-force, respectively, the total value of outside-force is increased progressively, and a following formula is presented:

$$\mu \cdot S \sin \Theta \cdot L = W_1 \cdot L_1 \cos \Theta_1 + W_2 \cdot L_2 \sin \Theta_2$$

wherein $W_2$ is the value of second weight 30, $L_2$ is the distance from the center line of the stationary axle pin 21 to the center of gravity of the second rotary weight 30 (shown in FIGURE 3), and $\Theta_2$ is the angular variation of the screw pin 29 (shown in FIGURE 3). It will be apparent that the left side and the right side of the above formula can be made equal even in the portion at which the radius is smaller than 7 cm. Namely, an outside-force varied as a curve Z shown in FIGURE 4 similar to the curve X of the inside-force can be obtained, therefore, the inside-force can be negated almost perfectly.

As stated above, the negation of the inside-force over the full extent of the record grooves, which could not be obtained up to this time, can be achieved, so that the tracing distortion can be made minimum, and especially in playing back "45—45" stereophonic records, as the stylus is contacted under a uniform pressure with the right and left sound faces of the record groove, a stereophonic sound with good balances of right and left channels can be played back.

It will be apparent to those skilled in the art that the novel principles of the invention disclosed herein in connection with specific exemplifications thereof will suggest various other modifications and applications of the same, for example, springs can be used in addition to or in place of the weights in the embodiment shown in the drawings.

What we claim is:

1. In a phonograph having a pickup arm receiving an inside-force which decreases gradually within a certain range and increases gradually out of said range according to playing back of records, a pickup device comprising said pickup arm, a stylus mounted on a free end of said arm, arm supporting means comprising a pedestal, a horizontally rotatable plate mounted on said pedestal, an arm support member mounted on said plate and having said arm vertically rotatably mounted thereon, a first pin mounted on said support member, a stationary axle pin fixed on said pedestal, first means for negating said inside-force within said range, said first means comprising a first rotary collar rotatably mounted on said axial pin, a second pin fixed to said collar on one end thereof to engage with said first pin, a third pin fixed to said collar, a first weight displaceably mounted on said third pin, and second means for negating said inside-force out of said range, said second means comprising a second rotary collar rotatably mounted on said axle pin, a fourth pin fixedly mounted on said second collar, a second weight displaceably mounted on said fourth pin, and clutch means selectively connecting said first and second collars and comprising a fifth pin fixedly mounted on one of said collars directed towards the other of said collars, said other collar having a stepped portion for engaging with said fifth pin.

2. A pickup device according to claim 1 wherein the center axis of said third pin is positioned in a substantially horizontal plane at the beginning of playing back of records.

3. A pickup device according to claim 1 wherein said third pin is externally threaded and said first weight has corresponding internal threads, said first weight being threaded on said third pin.

4. A pickup device according to claim 1 in which said fourth pin is externally threaded and said second weight has corresponding internal threads, said second weight being threaded on said fourth pin.

5. A pickup device according to claim 1 in which both said third and fourth pins are externally threaded and said first and second weights are internally threaded, said first and second weights being threadably mounted on said third and fourth pins respectively.

References Cited

UNITED STATES PATENTS 3,318,603 5/1967 Mortimer ____________ 274—23

HARRY N. HAROIAN, *Primary Examiner.*